US011988828B1

(12) United States Patent
El-Haddad et al.

(10) Patent No.: US 11,988,828 B1
(45) Date of Patent: May 21, 2024

(54) MULTI-PUPIL DISPLAY AND EYE-TRACKING WITH INTERFEROMETRIC SENSING

(71) Applicant: Meta Platforms Technologies, LLC, Menlo Park, CA (US)

(72) Inventors: Mohamed Tarek Ahmed El-Haddad, Redmond, WA (US); Francesco LaRocca, Kirkland, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 31 days.

(21) Appl. No.: 17/988,649

(22) Filed: Nov. 16, 2022

(51) Int. Cl.
G02B 27/00 (2006.01)
G02B 27/01 (2006.01)

(52) U.S. Cl.
CPC ..... G02B 27/0093 (2013.01); G02B 27/0172 (2013.01)

(58) Field of Classification Search
CPC ............... G06F 3/013; G02B 27/0172; G02B 2027/0174; G02B 2027/0178; G02B 27/0093

See application file for complete search history.

(56) References Cited

U.S. PATENT DOCUMENTS

| 10,222,615 | B2 | 3/2019 | Lowney et al. | |
|---|---|---|---|---|
| 10,394,034 | B2* | 8/2019 | Reshidko | G06V 40/197 |
| 10,732,427 | B2 | 8/2020 | Wall et al. | |
| 10,884,492 | B2 | 1/2021 | Eash et al. | |
| 11,231,592 | B2 | 1/2022 | Lanman | |
| 11,782,268 | B2* | 10/2023 | Ren | G02B 27/0093 345/8 |
| 2013/0077049 | A1* | 3/2013 | Bohn | G02B 27/0093 351/210 |
| 2013/0106674 | A1* | 5/2013 | Wheeler | G06F 3/013 345/8 |
| 2018/0149874 | A1* | 5/2018 | Aleem | G02B 27/0093 |
| 2019/0018485 | A1* | 1/2019 | Aleem | G06F 3/147 |
| 2019/0050051 | A1* | 2/2019 | Cirucci | H04N 25/40 |
| 2019/0056599 | A1* | 2/2019 | Reshidko | G02B 27/0172 |
| 2019/0369253 | A1* | 12/2019 | Aleem | G01S 17/66 |
| 2020/0249754 | A1* | 8/2020 | Morozov | G06F 3/0304 |
| 2020/0285848 | A1* | 9/2020 | Price | G02B 27/30 |
| 2021/0294103 | A1* | 9/2021 | Klug | G02B 27/0179 |
| 2022/0000362 | A1 | 1/2022 | Scheller et al. | |
| 2022/0146824 | A1* | 5/2022 | Ren | G02B 27/0172 |

OTHER PUBLICATIONS

Lv Z., et al., "Integrated Holographic Waveguide Display System with a Common Optical Path for Visible and Infrared Light," Optics Express, 2018, vol. 26, No. 25, 10 pages.

* cited by examiner

Primary Examiner — Dmitriy Bolotin
(74) Attorney, Agent, or Firm — Mannava & Kang, P.C.

(57) ABSTRACT

An eye-tracking system may include a light source to emit infrared (IR) light. A waveguide may include an input coupler. A scanner may be to direct the infrared (IR) light to the input coupler, which may be configured to direct the infrared (IR) light to exit the waveguide toward an eyebox region for eye-tracking. The scanner may be to direct visible light to the input coupler. The input coupler may be to direct the visible light toward the eyebox region for display as a virtual image. A sensor may be to generate an imaging signal when infrared (IR) light impinges upon the sensor via the scanner and the input coupler.

20 Claims, 9 Drawing Sheets

MULTI-PUPIL DISPLAY AND EYE-TRACKING WITH INTERFEROMETRIC SENSING

TECHNICAL FIELD

This patent application relates generally to optical lenses and components, and more specifically, to multi-pupil display and eye-tracking for various optical assemblies and systems, such as head-mounted display (HMD) devices.

BACKGROUND

With recent advances in technology, prevalence and proliferation of content creation and delivery has increased greatly in recent years. In particular, interactive content such as virtual reality (VR) content, augmented reality (AR) content, mixed reality (MR) content, and content within and associated with a real and/or virtual environment (e.g., a "metaverse") has become appealing to consumers.

To facilitate delivery of this and other related content, service providers have endeavored to provide various forms of wearable display systems. One such example may be a head-mounted display (HMD) device, such as a wearable eyewear, a wearable headset, or eyeglasses. In some examples, the head-mounted display (HMD) device may project or direct light to form a first image and a second image, and with these images, to generate "binocular" vision for viewing by a user. Eye-tracking may be used in some head-mounted display (HMD) devices. It may be important for components of an eye-tracking system to balance any number of system criteria, such as power consumption, size, weight, reliability, ease of manufacture, and cost, among other things. In many head-mounted display (HMD) devices, the eye-tracking system is also separate from the display system. The two systems may involve separate components and processors, which may increase bulk, limit features, and have separate and additive energy budgets. Furthermore, the processing of eye-tracking images may be computationally extensive and time-consuming.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Head-mounted display (HMD) devices used for augmented reality (AR) and virtual reality (VR) applications are, ideally, lightweight and power efficient. Such devices may use eye-tracking systems to track the position and/or motion of a user's eyes to determine a location in a field of view of a display to which the user's attention is directed. It may be important for components of an eye-tracking system to balance any number of system criteria, such as power consumption, size, weight, reliability, ease of manufacture, and cost. In many head-mounted display (HMD) devices, the eye-tracking system is separate from the display system. The two systems may involve separate components and processors and may have two energy budgets. Processing of eye-tracking images may be computationally expensive and slow.

Disclosed herein are systems, methods, and apparatuses that use a scanner, e.g., a microelectromechanical system (MEMS) scanner, to present a virtual image to an eyebox region and to image the same eyebox region for eye-tracking purposes. A pupil-replicating display waveguide may have a number of pupils. Visible light may be in-coupled into the waveguide via the scanner for presenting the virtual image. Infrared (IR) light may be in-coupled into the waveguide via the scanner for eye-tracking purposes. The waveguide may present virtual images to the eyebox region and out-couple the infrared (IR) to illuminate the eyebox region.

The same waveguide for both display and eye-tracking may be used when the display waveguide is configured as a multi-pupil location waveguide. This may expand the effective eyebox. The eye-tracking portion of the system may include a separate interferometric sensing system in which an optical path length of a reference arm corresponds to a particular pupil location of the waveguide. The sensitivity of the interferometric detection system may cause it to generate an imaging signal only when the user's pupil is looking at the particular pupil location. This phenomenon may reduce processing costs by obviating the need to analyze eye-tracking images from multiple pupil locations (e.g., all pupil locations). Rather, a signal at each interferometric detection system may prompt the eye-tracking system to analyze the eye-tracking image for the corresponding pupil location. In some examples, time-of-flight detectors with temporal-gated detection or direct-detection detectors with confocal or similar spatial-gating may also be used.

According to various examples, an eye-tracking system may include a light source configured to emit infrared (IR) light. A waveguide may include an input coupler. A scanner may be configured to direct the infrared (IR) light to the input coupler, which may be configured to direct the infrared (IR) light to exit the waveguide toward an eyebox region for eye-tracking. The scanner may be configured to direct visible light to the input coupler. The input coupler may be configured to direct the visible light toward the eyebox region for display as a virtual image. A sensor may be configured to generate an imaging signal when infrared (IR) light impinges upon the sensor via the scanner and the input coupler.

Figure 1:
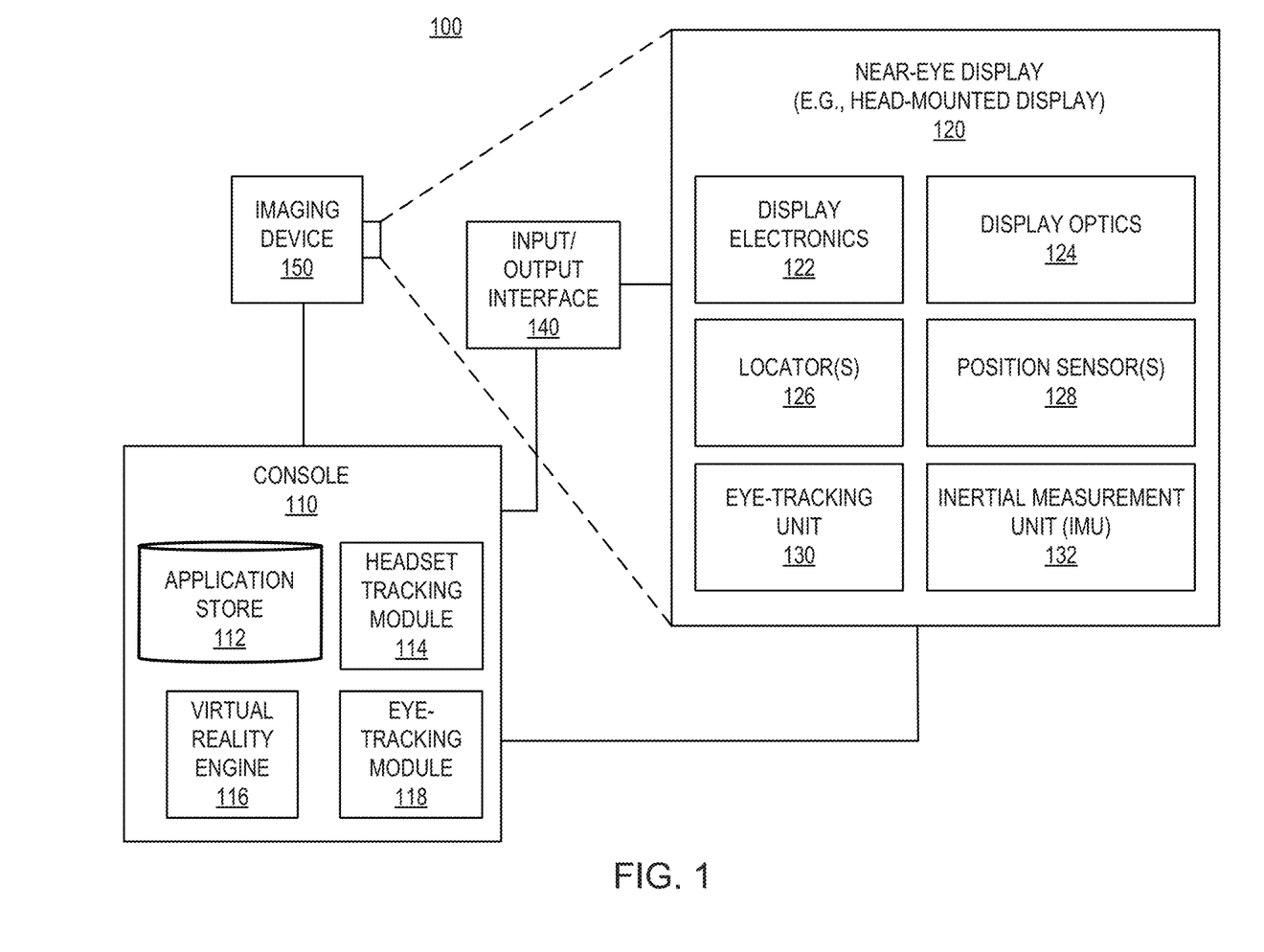
FIG. 1 illustrates a block diagram of an artificial reality system environment including a near-eye display, according to an example.

FIG. 1 illustrates a block diagram of an artificial reality system environment 100 including a near-eye display, according to an example. As used herein, a "near-eye display" may refer to a device (e.g., an optical device) that may be in close proximity to a user's eye. As used herein, "artificial reality" may refer to aspects of, among other things, a "metaverse" or an environment of real and virtual elements, and may include use of technologies associated with virtual reality (VR), augmented reality (AR), and/or mixed reality (MR). As used herein a "user" may refer to a user or wearer of a "near-eye display."

As shown in FIG. 1, the artificial reality system environment 100 may include a near-eye display 120, an optional external imaging device 150, and an optional input/output interface 140, each of which may be coupled to a console 110. The console 110 may be optional in some instances as the functions of the console 110 may be integrated into the near-eye display 120. In some examples, the near-eye display 120 may be a head-mounted display (HMD) that presents content to a user.

In some instances, for a near-eye display system, it may generally be desirable to expand an eye box, reduce display haze, improve image quality (e.g., resolution and contrast), reduce physical size, increase power efficiency, and increase or expand field of view (FOV). As used herein, "field of view" (FOV) may refer to an angular range of an image as seen by a user, which is typically measured in degrees as observed by one eye (for a monocular HMD) or both eyes (for binocular HMDs). Also, as used herein, an "eye box" may be a two-dimensional box that may be positioned in front of the user's eye from which a displayed image from an image source may be viewed.

In some examples, in a near-eye display system, light from a surrounding environment may traverse a "see-through" region of a waveguide display (e.g., a transparent substrate) to reach a user's eyes. For example, in a near-eye display system, light of projected images may be coupled into a transparent substrate of a waveguide, propagate within the waveguide, and be coupled or directed out of the waveguide at one or more locations to replicate exit pupils and expand the eye box.

In some examples, the near-eye display 120 may include one or more rigid bodies, which may be rigidly or non-rigidly coupled to each other. In some examples, a rigid coupling between rigid bodies may cause the coupled rigid bodies to act as a single rigid entity, while in other examples, a non-rigid coupling between rigid bodies may allow the rigid bodies to move relative to each other.

In some examples, the near-eye display 120 may be implemented in any suitable form-factor, including an HMD, a pair of glasses, or other similar wearable eyewear or device. Examples of the near-eye display 120 are further described below with respect to FIGS. 2 and 3. Additionally, in some examples, the functionality described herein may be used in an HMD or headset that may combine images of an environment external to the near-eye display 120 and artificial reality content (e.g., computer-generated images). Therefore, in some examples, the near-eye display 120 may augment images of a physical, real-world environment external to the near-eye display 120 with generated and/or overlaid digital content (e.g., images, video, sound, etc.) to present an augmented reality to a user.

In some examples, the near-eye display 120 may include any number of display electronics 122, display optics 124, and an eye-tracking unit 130. In some examples, the near eye display 120 may also include one or more locators 126, one or more position sensors 128, and an inertial measurement unit (IMU) 132. In some examples, the near-eye display 120 may omit any of the eye-tracking unit 130, the one or more locators 126, the one or more position sensors 128, and the inertial measurement unit (IMU) 132, or may include additional elements.

In some examples, the display electronics 122 may display or facilitate the display of images to the user according to data received from, for example, the optional console 110. In some examples, the display electronics 122 may include one or more display panels. In some examples, the display electronics 122 may include any number of pixels to emit light of a predominant color such as red, green, blue, white, or yellow. In some examples, the display electronics 122 may display a three-dimensional (3D) image, e.g., using stereoscopic effects produced by two-dimensional panels, to create a subjective perception of image depth.

In some examples, the display optics 124 may display image content optically (e.g., using optical waveguides and/or couplers) or magnify image light received from the display electronics 122, correct optical errors associated with the image light, and/or present the corrected image light to a user of the near-eye display 120. In some examples, the display optics 124 may include a single optical element or any number of combinations of various optical elements as well as mechanical couplings to maintain relative spacing and orientation of the optical elements in the combination. In some examples, one or more optical elements in the display optics 124 may have an optical coating, such as an anti-reflective coating, a reflective coating, a filtering coating, and/or a combination of different optical coatings.

In some examples, the display optics 124 may also be designed to correct one or more types of optical errors, such as two-dimensional optical errors, three-dimensional optical errors, or any combination thereof. Examples of two-dimensional errors may include barrel distortion, pincushion distortion, longitudinal chromatic aberration, and/or transverse chromatic aberration. Examples of three-dimensional errors may include spherical aberration, chromatic aberration field curvature, and astigmatism.

In some examples, the one or more locators 126 may be objects located in specific positions relative to one another and relative to a reference point on the near-eye display 120. In some examples, the optional console 110 may identify the one or more locators 126 in images captured by the optional external imaging device 150 to determine the artificial reality headset's position, orientation, or both. The one or more locators 126 may each be a light-emitting diode (LED), a corner cube reflector, a reflective marker, a type of light source that contrasts with an environment in which the near-eye display 120 operates, or any combination thereof.

In some examples, the external imaging device 150 may include one or more cameras, one or more video cameras, any other device capable of capturing images including the one or more locators 126, or any combination thereof. The optional external imaging device 150 may be configured to detect light emitted or reflected from the one or more locators 126 in a field of view of the optional external imaging device 150.

In some examples, the one or more position sensors 128 may generate one or more measurement signals in response to motion of the near-eye display 120. Examples of the one or more position sensors 128 may include any number of accelerometers, gyroscopes, magnetometers, and/or other motion-detecting or error-correcting sensors, or any combination thereof.

In some examples, the inertial measurement unit (IMU) 132 may be an electronic device that generates fast calibration data based on measurement signals received from the one or more position sensors 128. The one or more position sensors 128 may be located external to the inertial measurement unit (IMU) 132, internal to the inertial measurement unit (IMU) 132, or any combination thereof. Based on the one or more measurement signals from the one or more position sensors 128, the inertial measurement unit (IMU) 132 may generate fast calibration data indicating an estimated position of the near-eye display 120 that may be relative to an initial position of the near-eye display 120. For example, the inertial measurement unit (IMU) 132 may integrate measurement signals received from accelerometers over time to estimate a velocity vector and integrate the velocity vector over time to determine an estimated position of a reference point on the near-eye display 120. Alternatively, the inertial measurement unit (IMU) 132 may provide the sampled measurement signals to the optional console 110, which may determine the fast calibration data.

The eye-tracking unit 130 may include one or more eye-tracking systems. As used herein, "eye tracking" may refer to determining an eye's position or relative position, including orientation, location, and/or gaze of a user's eye. In some examples, an eye-tracking system may include an imaging system that captures one or more images of an eye and may optionally include a light emitter, which may generate light that is directed to an eye such that light reflected by the eye may be captured by the imaging system. In other examples, the eye-tracking unit 130 may capture reflected radio waves emitted by a miniature radar unit. These data associated with the eye may be used to determine or predict eye position, orientation, movement, location, and/or gaze.

In some examples, the near-eye display 120 may use the orientation of the eye to introduce depth cues (e.g., blur image outside of the user's main line of sight), collect heuristics on the user interaction in the virtual reality (VR) media (e.g., time spent on any particular subject, object, or frame as a function of exposed stimuli), some other functions that are based in part on the orientation of at least one of the user's eyes, or any combination thereof. In some examples, because the orientation may be determined for both eyes of the user, the eye-tracking unit 130 may be able to determine where the user is looking or predict any user patterns, etc.

In some examples, the input/output interface 140 may be a device that allows a user to send action requests to the optional console 110. As used herein, an "action request" may be a request to perform a particular action. For example, an action request may be to start or to end an application or to perform a particular action within the application. The input/output interface 140 may include one or more input devices. Example input devices may include a keyboard, a mouse, a game controller, a glove, a button, a touch screen, or any other suitable device for receiving action requests and communicating the received action requests to the optional console 110. In some examples, an action request received by the input/output interface 140 may be communicated to the optional console 110, which may perform an action corresponding to the requested action.

In some examples, the optional console 110 may provide content to the near-eye display 120 for presentation to the user in accordance with information received from one or more of external imaging device 150, the near-eye display 120, and the input/output interface 140. For example, in the example shown in FIG. 1, the optional console 110 may include an application store 112, a headset tracking module 114, a virtual reality engine 116, and an eye-tracking module 118. Some examples of the optional console 110 may include different or additional modules than those described in conjunction with FIG. 1. Functions further described below may be distributed among components of the optional console 110 in a different manner than is described here.

In some examples, the optional console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In some examples, the modules of the optional console 110 described in conjunction with FIG. 1 may be encoded as instructions in the non-transitory computer-readable storage medium that, when executed by the processor, cause the processor to perform the functions further described below. It should be appreciated that the optional console 110 may or may not be needed or the optional console 110 may be integrated with or separate from the near-eye display 120.

In some examples, the application store 112 may store one or more applications for execution by the optional console 110. An application may include a group of instructions that, when executed by a processor, generates content for presentation to the user. Examples of the applications may include gaming applications, conferencing applications, video playback application, or other suitable applications.

In some examples, the headset tracking module 114 may track movements of the near-eye display 120 using slow calibration information from the external imaging device 150. For example, the headset tracking module 114 may determine positions of a reference point of the near-eye display 120 using observed locators from the slow calibration information and a model of the near-eye display 120. Additionally, in some examples, the headset tracking module 114 may use portions of the fast calibration information, the slow calibration information, or any combination thereof, to predict a future location of the near-eye display 120. In some examples, the headset tracking module 114 may provide the estimated or predicted future position of the near-eye display 120 to the virtual reality engine 116.

In some examples, the virtual reality engine 116 may execute applications within the artificial reality system environment 100 and receive position information of the near-eye display 120, acceleration information of the near-eye display 120, velocity information of the near-eye display 120, predicted future positions of the near-eye display 120, or any combination thereof from the headset tracking module 114. In some examples, the virtual reality engine 116 may also receive estimated eye position and orientation information from the eye-tracking module 118. Based on the received information, the virtual reality engine 116 may determine content to provide to the near-eye display 120 for presentation to the user.

In some examples, the eye-tracking module 118 may receive eye-tracking data from the eye-tracking unit 130 and determine the position of the user's eye based on the eye tracking data. In some examples, the position of the eye may include an eye's orientation, location, or both relative to the near-eye display 120 or any element thereof. So, in these examples, because the eye's axes of rotation change as a function of the eye's location in its socket, determining the eye's location in its socket may allow the eye-tracking module 118 to more accurately determine the eye's orientation.

In some examples, a location of a projector of a display system may be adjusted to enable any number of design modifications. For example, in some instances, a projector may be located in front of a viewer's eye (i.e., "front-mounted" placement). In a front-mounted placement, in some examples, a projector of a display system may be located away from a user's eyes (i.e., "world-side"). In some examples, a head-mounted display (HMD) device may utilize a front-mounted placement to propagate light towards a user's eye(s) to project an image.

Figure 2:
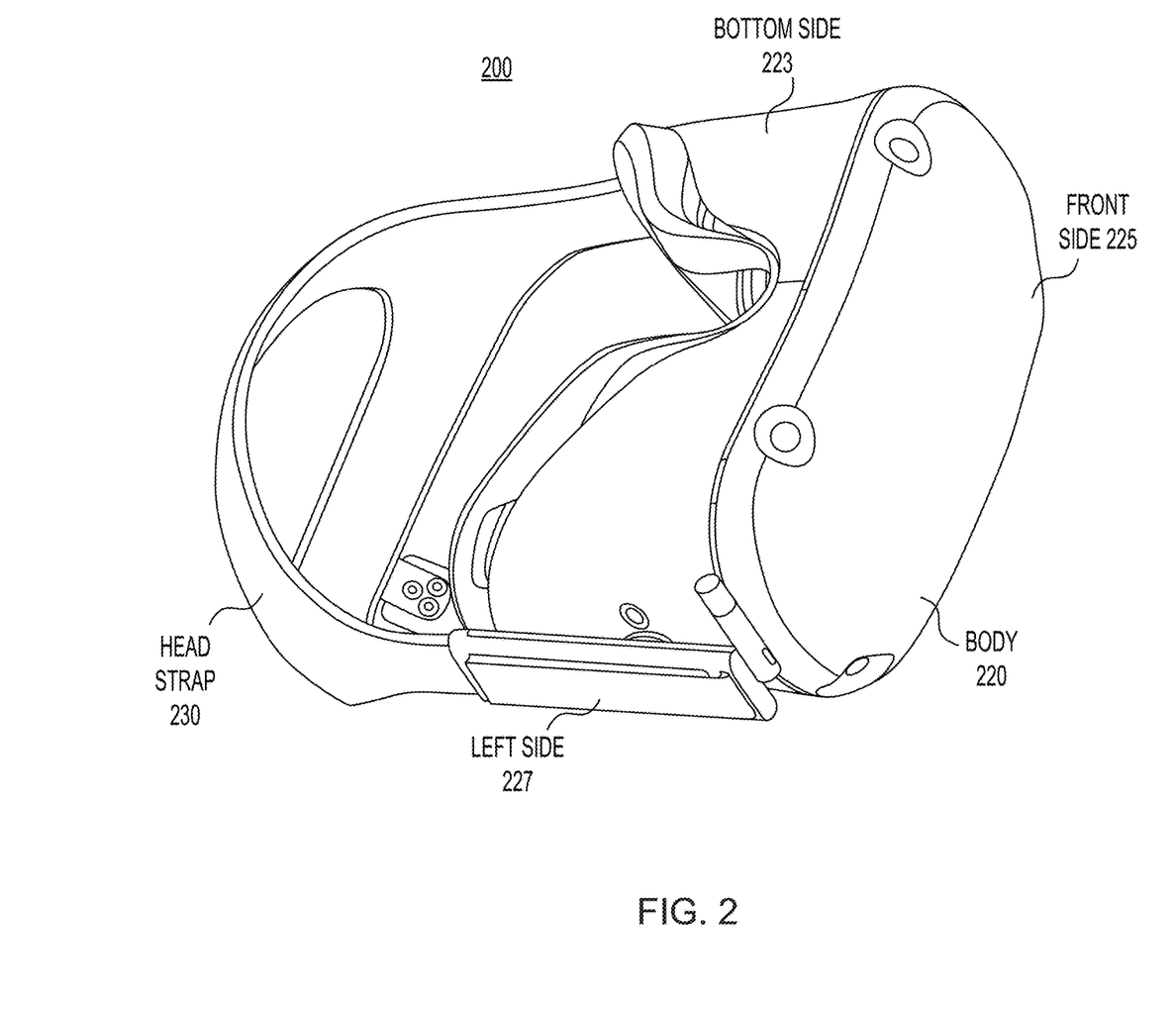
FIG. 2 illustrates a perspective view of a near-eye display in the form of a head-mounted display (HMD) device, according to an example.

FIG. 2 illustrates a perspective view of a near-eye display in the form of a head-mounted display (HMD) device 200, according to an example. In some examples, the HMD device 200 may be a part of a virtual reality (VR) system, an augmented reality (AR) system, a mixed reality (MR) system, another system that uses displays or wearables, or any combination thereof. In some examples, the HMD device 200 may include a body 220 and a head strap 230. FIG. 2 shows a bottom side 223, a front side 225, and a left side 227 of the body 220 in the perspective view. In some examples, the head strap 230 may have an adjustable or extendible length. In particular, in some examples, there may be a sufficient space between the body 220 and the head strap 230 of the HMD device 200 for allowing a user to mount the HMD device 200 onto the user's head. For example, the length of the head strap 230 may be adjustable to accommodate a range of user head sizes. In some examples, the HMD device 200 may include additional, fewer, and/or different components.

In some examples, the HMD device 200 may present, to a user, media or other digital content including virtual and/or augmented views of a physical, real-world environment with computer-generated elements. Examples of the media or digital content presented by the HMD device 200 may include images (e.g., two-dimensional (2D) or three-dimensional (3D) images), videos (e.g., 2D or 3D videos), audio, or any combination thereof. In some examples, the images and videos may be presented to each eye of a user by one or more display assemblies (not shown in FIG. 2) enclosed in the body 220 of the HMD device 200.

In some examples, the HMD device 200 may include various sensors (not shown), such as depth sensors, motion sensors, position sensors, and/or eye tracking sensors. Some of these sensors may use any number of structured or unstructured light patterns for sensing purposes. In some examples, the HMD device 200 may include an input/output interface 140 for communicating with a console 110, as described with respect to FIG. 1. In some examples, the HMD device 200 may include a virtual reality engine (not shown), but similar to the virtual reality engine 116 described with respect to FIG. 1, that may execute applications within the HMD device 200 and receive depth information, position information, acceleration information, velocity information, predicted future positions, or any combination thereof of the HMD device 200 from the various sensors.

In some examples, the information received by the virtual reality engine 116 may be used for producing a signal (e.g., display instructions) to the one or more display assemblies. In some examples, the HMD device 200 may include locators (not shown), but similar to the virtual locators 126 described in FIG. 1, which may be located in fixed positions on the body 220 of the HMD device 200 relative to one another and relative to a reference point. Each of the locators may emit light that is detectable by an external imaging device. This may be useful for the purposes of head tracking or other movement/orientation. It should be appreciated that other elements or components may also be used in addition or in lieu of such locators.

It should be appreciated that in some examples, a projector mounted in a display system may be placed near and/or closer to a user's eye (i.e., "eye-side"). In some examples, and as discussed herein, a projector for a display system shaped liked eyeglasses may be mounted or positioned in a temple arm (i.e., a top far corner of a lens side) of the eyeglasses. It should be appreciated that, in some instances, utilizing a back-mounted projector placement may help to reduce size or bulkiness of any required housing required for a display system, which may also result in a significant improvement in user experience for a user.

Figure 3:
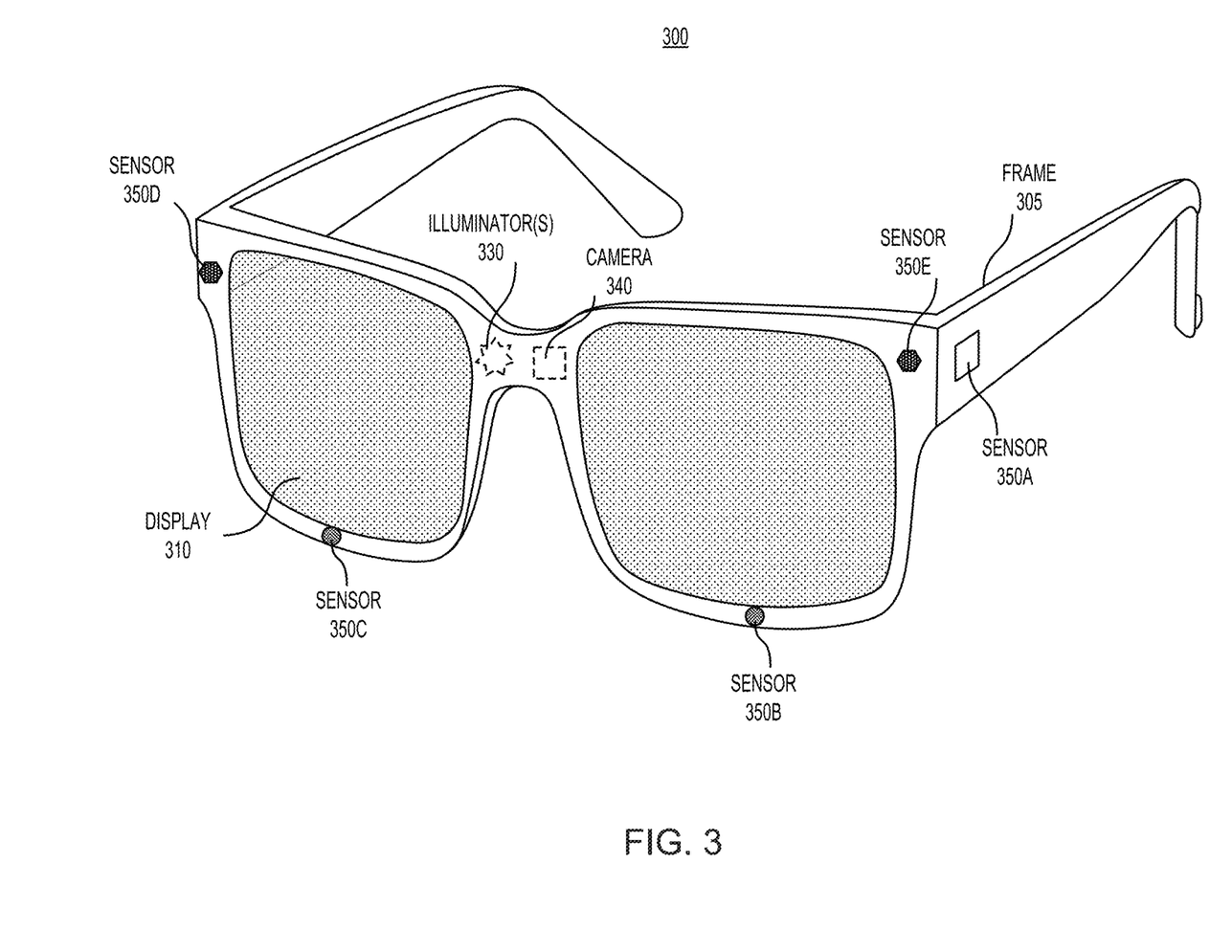
FIG. 3 illustrates a perspective view of a near-eye display in the form of a pair of glasses, according to an example.

FIG. 3 is a perspective view of a near-eye display 300 in the form of a pair of glasses (or other similar eyewear), according to an example. In some examples, the near-eye display 300 may be a specific example of near-eye display 120 of FIG. 1 and may be configured to operate as a virtual reality display, an augmented reality display, and/or a mixed reality display.

In some examples, the near-eye display 300 may include a frame 305 and a display 310. In some examples, the display 310 may be configured to present media or other content to a user. In some examples, the display 310 may include display electronics and/or display optics, similar to components described with respect to FIGS. 1-2. For example, as described above with respect to the near-eye display 120 of FIG. 1, the display 310 may include a liquid crystal display (LCD) display panel, a light-emitting diode (LED) display panel, or an optical display panel (e.g., a waveguide display assembly). In some examples, the display 310 may also include any number of optical components, such as waveguides, gratings, lenses, mirrors, etc.

In some examples, the near-eye display 300 may further include various sensors 350a, 350b, 350c, 350d, and 350e on or within a frame 305. In some examples, the various sensors 350a-350e may include any number of depth sensors, motion sensors, position sensors, inertial sensors, and/or ambient light sensors, as shown. In some examples, the various sensors 350a-350e may include any number of image sensors configured to generate image data representing different fields of views in one or more different directions. In some examples, the various sensors 350a-350e may be used as input devices to control or influence the displayed content of the near-eye display 300, and/or to provide an interactive virtual reality (VR), augmented reality (AR), and/or mixed reality (MR) experience to a user of the near-eye display 300. In some examples, the various sensors 350a-350e may also be used for stereoscopic imaging or other similar application.

In some examples, the near-eye display 300 may further include one or more illuminators 330 to project light into a physical environment. The projected light may be associated with different frequency bands (e.g., visible light, infra-red light, ultra-violet light, etc.), and may serve various purposes. In some examples, the one or more illuminator(s) 330 may be used as locators, such as the one or more locators 126 described above with respect to FIGS. 1-2.

In some examples, the near-eye display 300 may also include a camera 340 or other image capture unit. The camera 340, for instance, may capture images of the physical environment in the field of view. In some instances, the captured images may be processed, for example, by a virtual reality engine (e.g., the virtual reality engine 116 of FIG. 1) to add virtual objects to the captured images or modify physical objects in the captured images, and the processed images may be displayed to the user by the display 310 for augmented reality (AR) and/or mixed reality (MR) applications.

According to various examples, an integrated display and eye-tracking system may use one scanner, such as a microelectromechanical system (MEMS) scanner, both to present a virtual image to an eyebox region and to image the eyebox region for eye-tracking purposes. A pupil-replicating display waveguide may have a plurality of pupils. Visible light may be incoupled into the waveguide via the scanner for presenting the virtual image. Infrared (IR) light may be incoupled into the waveguide via the same scanner for eye-tracking purposes. The waveguide may present virtual images to the eyebox region and outcouple the infrared (IR) light to illuminate the eyebox region for eye-tracking purposes.

When the display waveguide is configured as a multi-pupil location waveguide, it may be used for both display and eye-tracking. The eye-tracking portion of the system may include separate interferometric detection systems. The interferometric detection systems may include a reference arm that has an optical path length that may correspond to the particular pupil location of the waveguide. The interferometric detection system is sensitive and only generates an imaging signal when a user's eye (e.g., pupil) is looking at the particular pupil location. This may have the additional benefit of reducing processing costs by obviating the need to analyze eye-tracking images from all pupil locations. Rather, a detection signal at each interferometric detection system may prompt the eye-tracking system to analyze the eye-tracking image for the correct pupil location.

Figure 4:
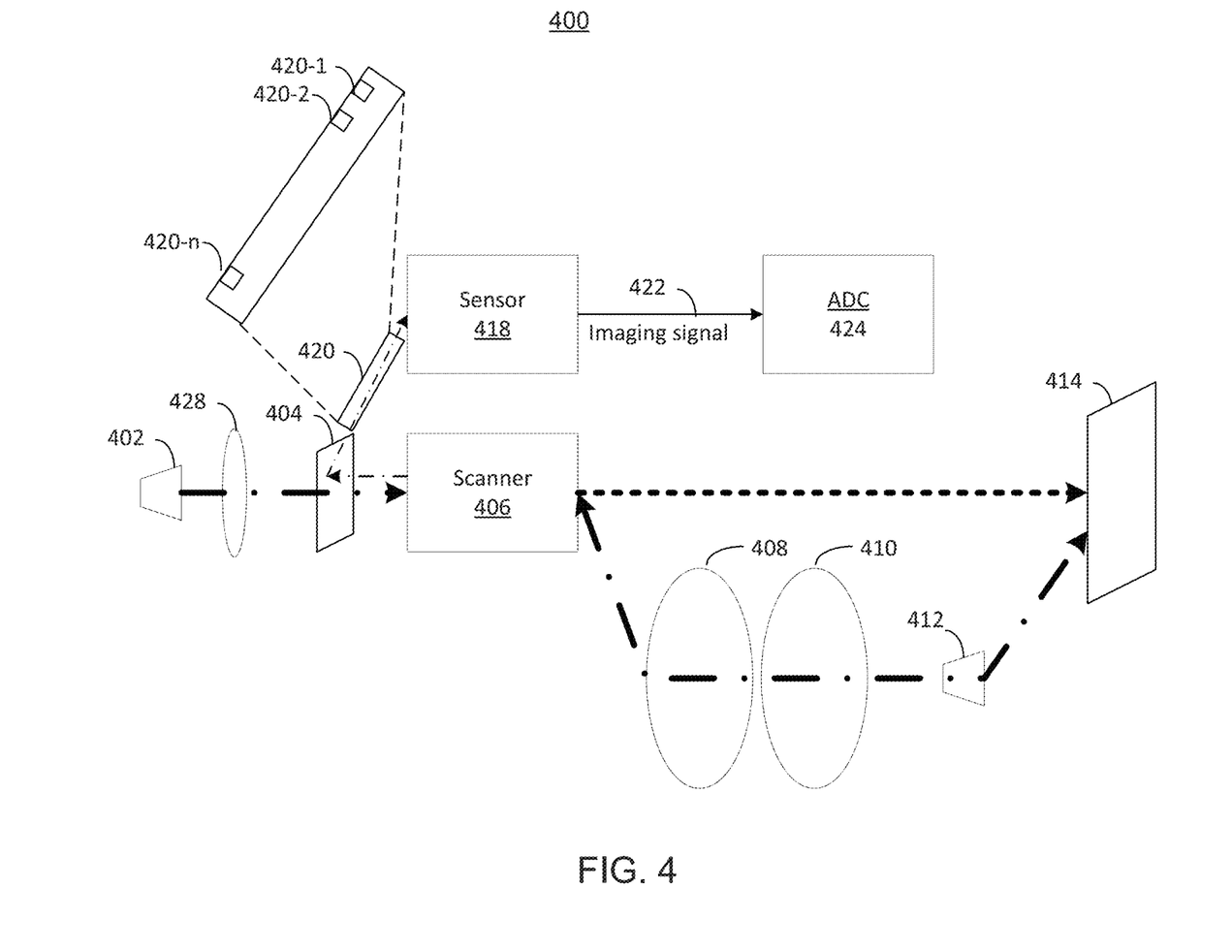
FIG. 4 illustrates a block diagram of an eye-tracking system, according to an example.

FIG. 4 illustrates a block diagram of an eye-tracking system 400, according to an example. The eye-tracking system 400 may be used in a near-eye display or a head-mounted display (HMD) device, such as the ones described in FIGS. 1-3, or other display system. In some examples, the eye-tracking system 400 may have an illumination path that may include a light source 402. The light source 402 may be configured to emit various types of optical signals, such as visible or infrared (IR) light.

In some examples, the eye-tracking system 400 may include a beam splitter 404, a scanner 406, optional optical components 408 and/or 410, and/or an input coupler 412. Optical signals emitted from the eye-tracking system 400 may traverse or pass through any number of these components or any number of times. In some examples, the optical signals emitted may pass through the beam splitter 404, the scanner 406, optional optical components 408 and/or 410, and/or the input coupler 412, in accordance with an illumination or detection path, and ultimately illuminate an eyebox region 414 with infrared (IR) light, which may be used for eye-tracking purposes.

It should be appreciated that the scanner 406 may be implemented, for example, as a microelectromechanical system (MEMS) scanner that is configured to move in a two-dimensional manner. In this way, the scanner 406 may direct the infrared (IR) light to different imaging points in the eyebox region 414. Other various examples or configurations may also be provided.

The eye-tracking system 400 may also have a sensing path in which returning light propagates to the beam splitter 404 in a reverse-optical path as the infrared (IR) light illuminating the eyebox region 414. Accordingly, the eye-tracking system 400 may be considered a double-pass system. The returning light may be the illuminating infrared (IR) light reflecting or scattering from an eye of the user that occupies the eyebox region 414, for example. Skin, eyelashes, and/or eyebrows may also reflect and/or scatter the illumination light illuminating the eyebox region 414. The returning light may propagate to the input coupler 412 and through optional optical components 408 and 410 (if present). The returning light may reflect off the scanner 406 and off the beam splitter 404 as returning light 416 to a sensor 418. A waveguide 420 or optical fiber may be optically coupled to guide the returning light from the beam splitter 404 to the sensor 418. It will be appreciated that, while some examples are disclosed as being implemented using fibers or optical fibers, such examples may be implemented using any combination of bulk optics, fiber optics, and/or integrated-photonic components.

In some examples, the sensor 418 generates an imaging signal 422 when the returning light is incident on the sensor 418. The imaging signal 422 may be implemented as an analog signal. An analog-to-digital converter (ADC) 424 may convert the analog signal to a digital imaging signal 426. The analog-to-digital converter (ADC) 424 may provide the digital imaging signal to processing logic that may be configured to generate an eye-tracking image based at least in part on imaging signals. As the scanner 406 scans through and illuminates different imaging points of the eyebox region 414 with infrared (IR) light, a digital imaging signal 426 may be generated for each imaging point and may be stored to a memory. Accordingly, each imaging point within the eyebox region 414 may be associated with a corresponding digital imaging signal 426 so that imaging signals may be aggregated to assist in generating an eye-tracking image of the eyebox region 414.

In some examples, the light source 402 is configured to emit infrared (IR) light. The light source 402 may include one or more light emitting diodes (LEDs), one or more vertical-cavity surface emitting lasers (VCSELs), micro light emitting diodes (micro-LEDs), edge emitting light emitting diodes (EELEDs), one or more superluminescent diodes (SLEDs), or another type of light source. The light source 402 may emit near-infrared (NIR) light. A lens 428 may be used to control the shape of the infrared (IR) light beam at the scanner 406 or at the eyebox region 414. For example, the lens 428 may be designed such that light rays emitted by the light source 402 are collimated or focused. The lens 428 may provide a focus-turning mechanism that controls where the rays focus along the optical path.

In some examples, the beam splitter 404 may be implemented as a polarized beam splitter (PBS). The scanner 406 may be implemented as a microelectromechanical systems (MEMS) scanner having a reflective surface that can be moved or adjusted along two axes of rotation. The sensor 418 may be implemented as a light-sensitive sensor (e.g., a sensor that is sensitive to infrared (IR) or near-infrared (NIR) beams of light). In some examples, the sensor 418 may include one or more photodiodes.

In some examples, the waveguide 420 may comprise the input coupler 412. The input coupler 412 may be implemented as a diffractive optical element that is configured to operate on the specific wavelength or wavelengths of light (e.g., infrared (IR) light) emitted by the light source 402 while passing other wavelengths of light. The input coupler 412 may be implemented as a holographic optical element configured to operate on the specific wavelength or wavelengths of light emitted by light source 402. The input coupler 412 may be reflective or refractive. The input coupler 412 may be configured to diffract infrared (IR) or near-infrared (NIR) light to exit the waveguide 420 toward the eyebox region 414 for eye-tracking. The input coupler 412 may be configured to direct (e.g., pass) visible light (from a separate visible light source) toward the eyebox region 414 for display as a virtual image, e.g., without diffraction. In some examples, the display and eye-tracking lights (from two separate sources) may both share the same input coupler, waveguide, and/or output coupler. Passing visible light may allow for display light (if any) or scene light from an external environment of a head mounted display (HMD) device to propagate through the input coupler 412 to be viewed by a user of the head mounted display (HMD) device.

In some examples, the waveguide 420 may be implemented as a multi-pupil display waveguide that includes a plurality of pupils 420-1, 420-2, . . . , 420-n. The pupils 420-1, 420-2, . . . , 420-n may each correspond to a portion of the eyebox region 414. The sensor 418 may include a plurality of detectors that each correspond to a respective pupil. In some examples, each detector generates a detection signal when the user's eye looks at a location associated with the pupil corresponding to the detector. The detection signal may cause the sensor to analyze an eye-tracking image that is associated with the location.

Figure 5:
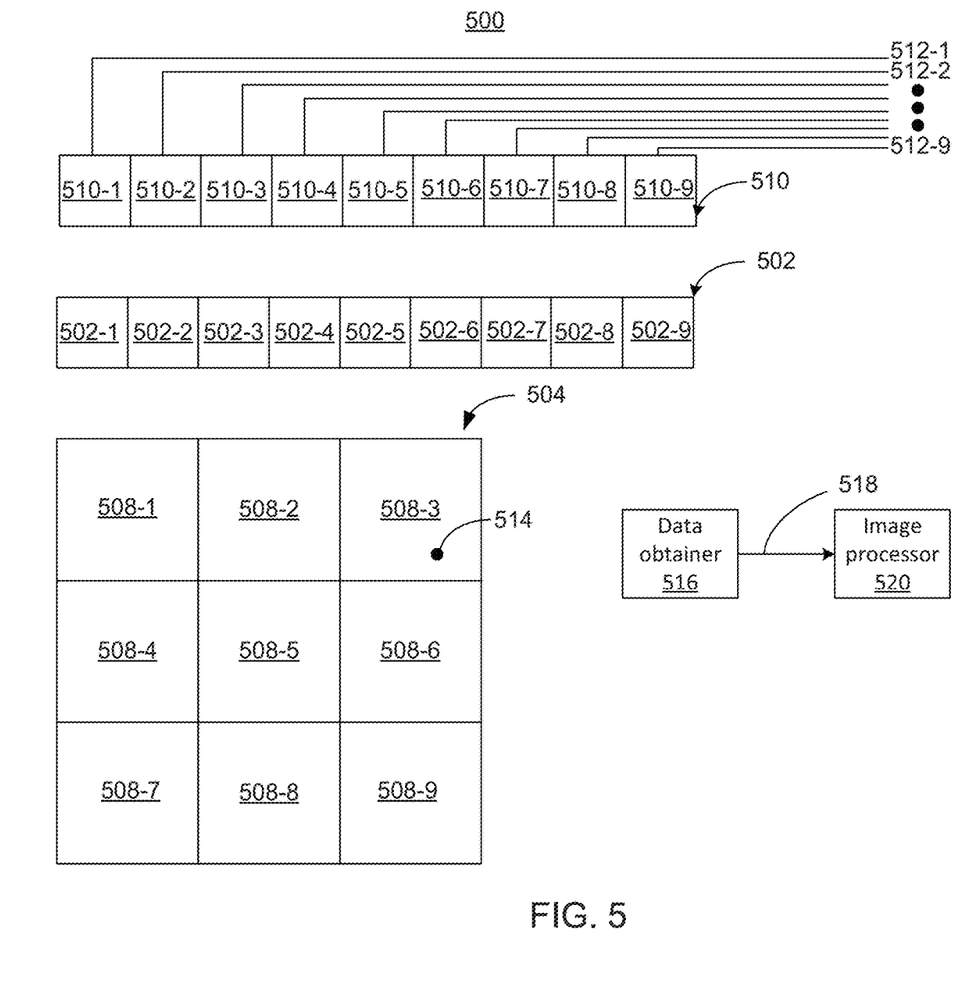
FIG. 5 illustrates a diagram of a pupil arrangement, according to some examples.

FIG. 5 illustrates a diagram of an example pupil arrangement 500. In some examples, a waveguide 502 comprises a multi-pupil display waveguide that includes a plurality of pupils. The pupils may correspond to respective portions of an eyebox region 504. For example, the waveguide 502 may include pupils 506-1, 506-2, . . . , 506-9. The eyebox region 504 may be divided into a plurality of portions 508-1, 508-2, . . . , 508-9; the quantity of portions may be equal to the quantity of pupils. It will be appreciated that, while FIG. 5 illustrates nine pupils in the waveguide 502 and nine portions of the eyebox region 504, a greater or lesser number of pupils may be present in a multi-pupil display waveguide. Similarly, the eyebox region 504 may be divided into more or fewer portions. It should be appreciated that the division is not physical, but virtual/logical to aid in the design of the eye-tracking detection.

In some examples, a sensor 510 is configured to detect a location at which a user's eye is looking on a per pupil basis. For example, the sensor 510 may be configured to determine whether the user's eye is looking at portion 508-1 or 508-9. The sensor 510 may generate an imaging signal when infrared (IR) light impinges upon the sensor 510, e.g., due to the user's eye looking at a location within the eyebox region 504.

In some examples, the sensor 510 may generate the imaging signal based on interferometric detection. For example, the sensor 510 may include a plurality of interferometric detectors 510-1, 510-2, . . . , 510-9. Each interferometric detector 510-1, 510-2, . . . , 510-9 may correspond to a respective pupil 506-1, 506-2, . . . , 506-9 of the waveguide 502. For example, interferometric detector 510-1 may correspond to pupil 506-1.

Each interferometric detector 510-1, 510-2, . . . , 510-9 may generate a detection signal 512-1, 512-2, . . . , 512-9 in response to an eye of the user looking at a location 514 that is associated with the pupil corresponding to the interferometric detector. For example, interferometric detector 510-1 may generate detection signal 512-1 when the eye of the user looks at a location that is associated with the pupil 506-1.

In some examples, the detection signal 512-1, 512-2, . . . , 512-9 may cause the sensor 510 to analyze an eye-tracking image that is associated with the location 514. For example, if the user's eye looks at a location associated with the pupil 506-1, the detection signal 512-1 may cause the sensor 510 to analyze an eye-tracking image that is associated with the pupil 506-1. Based on the user's retinal location, an interferometer corresponding to the correct pupil may generate a higher intensity interferometric signal compared to other interferometers. The signal may then pass through a signal processing pipeline that may convert the sensor signal to an image point. An example pipeline may include demodulation, background subtraction, and averaging. As the image is obtained one point at a time, the output signal from the pipeline (per point) may be mapped to angles/pixels based on a scanner angle, and the image may be built up. The image may present the user's retina. Tracking of user's gaze may be performed by registering the obtained image to a larger field of view (FOV) scan of the retina obtained in a calibration step or a strip-based cross-correlation for kHz-rate tracking. In some examples, a data obtainer 516 may obtain image data 518 corresponding to the pupil 506-1 as explained above. An image processor 520 may analyze the image data 518 to determine the location at which the user's gaze is directed. For example, the location may be determined based on the position of the user's pupil or pupils and/or any glints, e.g., reflections of light from the user's pupil or pupils (retina). The interferometric sensing enables spatially gating the signal based on pupil location, amplifying signal from the retina only while coherently gating out stray reflections from other reflections in the path (such as prescription glasses, cornea, etc.).

In some examples, the detection signals 512-1, 512-2, . . . , 512-9 are used to select which image data to analyze. For example, if the detection signals 512-1 and 512-2 indicate that the user's eye is looking at the locations associated with pupils 506-1 and 506-2, the image processor 520 may analyze only image data 518 corresponding to locations associated with pupils 506-1 and 506-2. The image processor 520 may forego analyzing image data 518 that corresponds to locations associated with pupils that the detection signals indicate that the user's eyes did not look at.

Figure 6:
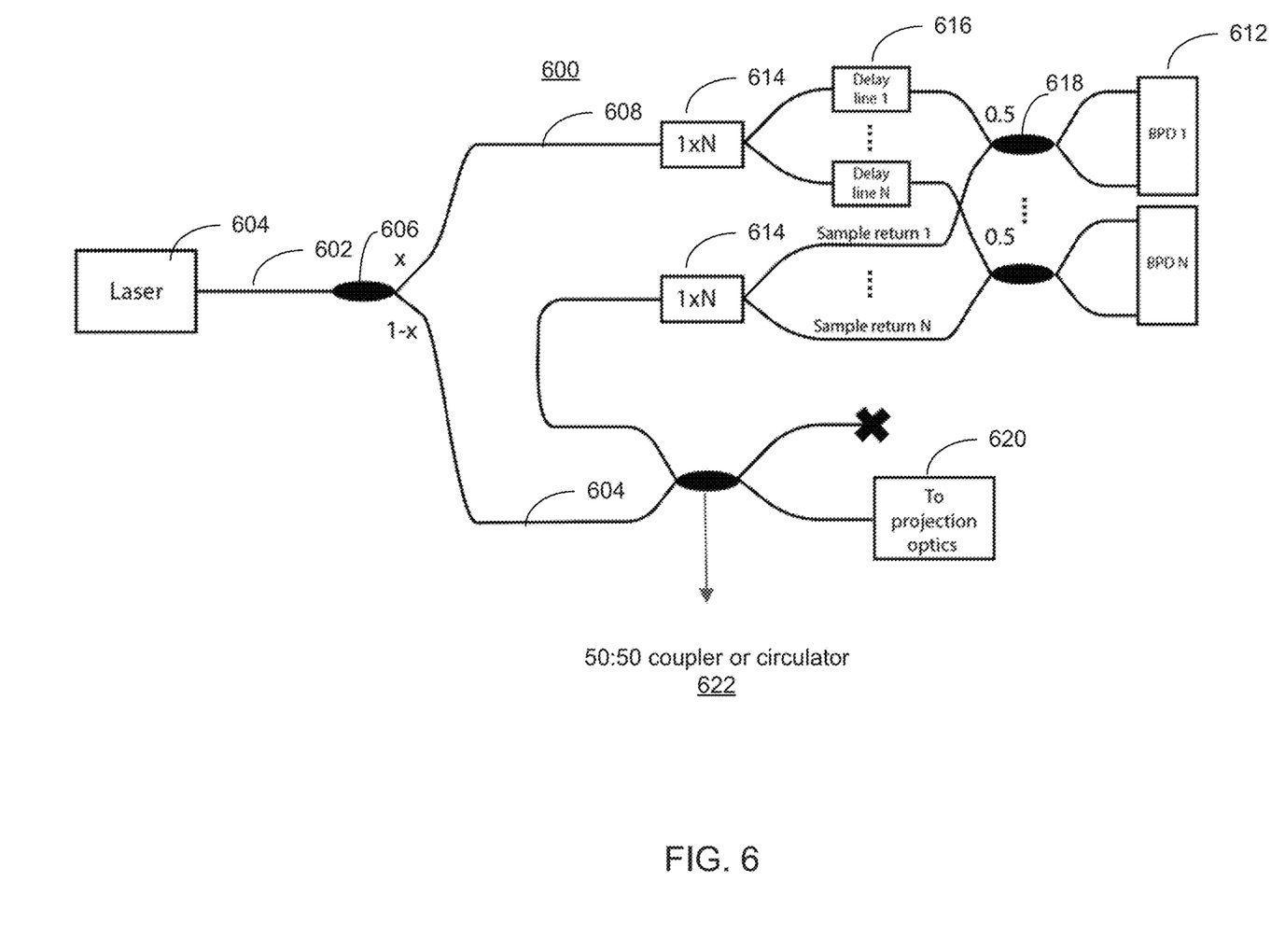
FIG. 6 illustrates a schematic diagram of an interferometric detection system, according to some examples.

FIG. 6 illustrates a schematic diagram of an interferometric detection system 600, according to some examples. In the interferometric detection system 600, a light field 602 is emitted by a light source 604, such as a laser. In some examples, the light source 604 is configured to emit infrared (IR) light. The light source 604 may include one or more light emitting diodes (LEDs), one or more vertical-cavity surface emitting lasers (VCSELs), micro light emitting diodes (micro-LEDs), edge emitting light emitting diodes (EELEDs), one or more superluminescent diodes (SLEDs), or another type of light source. The light source 604 may emit near-infrared (NIR) light.

In some examples, the light field 602 enters a beam splitter 606 and is split into a light field 608 and a light field 604. As shown in the diagram, a detection path may include a 1×N splitter 614 and a balanced photodetector (BPD) 612 with delay lines 616 in between. Light field 604 propagates through a coupler 622 and to projection optics 620, which delivers the light to the eyebox. The reflected signal goes back through the coupler 622 and is detected through the other arm (above the light field 604). The reflected signal goes through 1×N splitter 614 and is combined and/or interfered with reference signal from delay lines 1 to N 616. The delay line(s) corresponding to the right pupil may result in a strong interference signal compared to all others, which may only have background signal. The delay lines 616 are separate from the waveguide.

It will be appreciated that, while some examples are disclosed as being implemented using fibers or optical fibers, such examples may be implemented using any combination of bulk optics, fiber optics, and/or integrated-photonic components.

Figure 7:
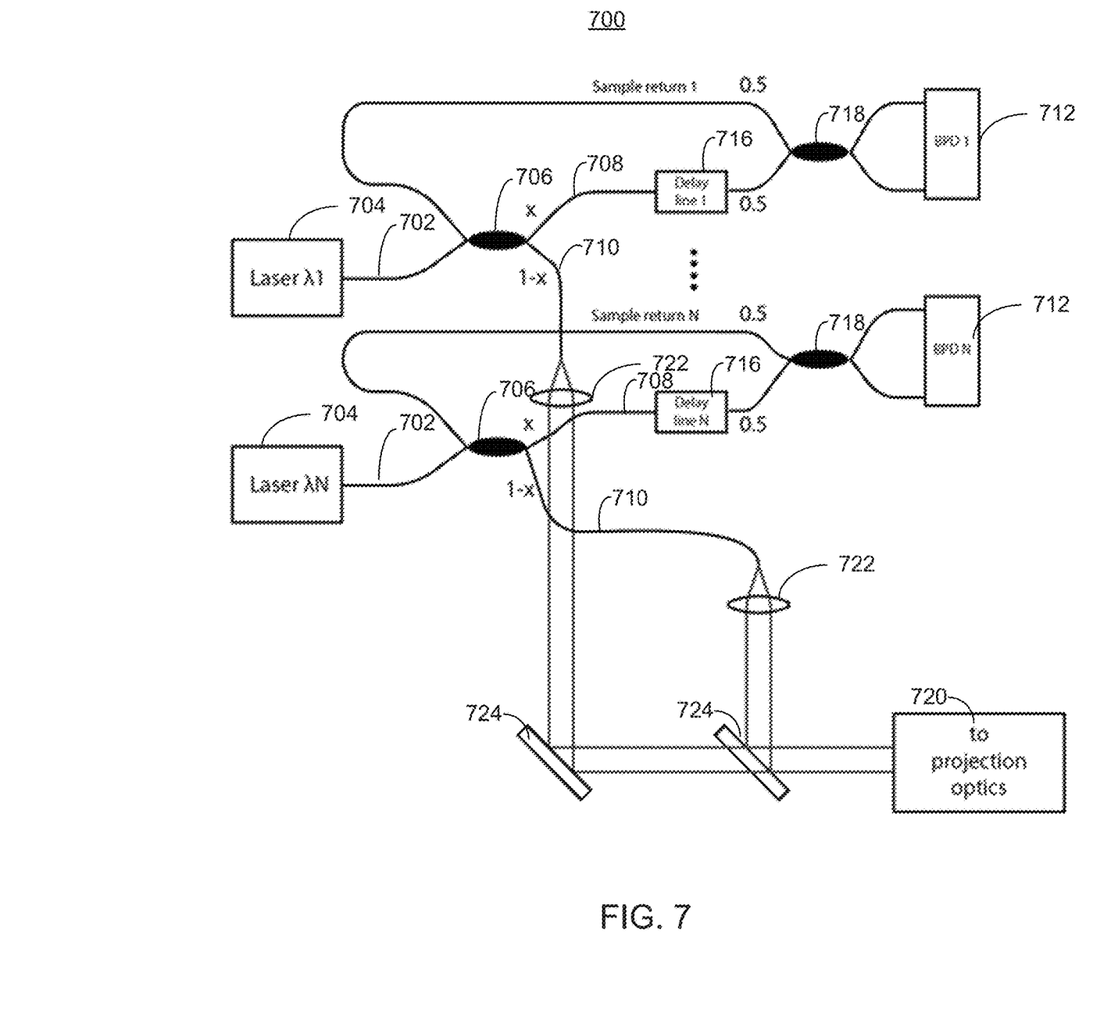
FIG. 7 illustrates a schematic diagram of an interferometric detection system, according to some examples.

FIG. 7 illustrates a schematic diagram of an interferometric detection system 700, according to some examples. In the interferometric detection system 700, light fields 702 are emitted by light sources 704, such as lasers. In some examples, the light sources 704 emit infrared (IR) light. The light sources 704 may include one or more light emitting diodes (LEDs), one or more vertical-cavity surface emitting lasers (VCSELs), micro light emitting diodes (micro-LEDs), edge emitting light emitting diodes (EELEDs), one or more superluminescent diodes (SLEDs), or another type of light source. The light sources 704 may emit near-infrared (NIR) light.

In some examples, the light fields 702 enter beam splitters 706 and is split into a light field 708 and a light field 710. Detection paths may include beam splitters 706, delay lines 716, beam splitters 718, and balanced photodetectors (BPDs). Light fields 710 propagate through respective lenses 722 and partial (or complete) reflective mirrors 724 to projection optics 720, which delivers the light to the eyebox. The partial (or complete) reflective mirrors 724 may comprise dichroic reflectors or Bragg gratings, in some examples. The reflected signals are detected through the upper arms (above the light fields 710). In FIG. 6, the light field (and the reflected signal) a split over N interferometers in power. In the schematic diagram of an interferometric detection system 700 of FIG. 7, N independent interferometers correspond to N different spectral bands. Thus, a more efficient splitting of incident and reflected light per spectral band is achieved compared to the configuration in FIG. 6. For y single pass waveguide efficiency and uniform split over N pupils, sample arm round-trip efficiency may be expressed as:

$$\frac{(1-x)*y^2}{N} \quad [1]$$

Thus, the second interferometer is (N/(1−x)) more efficient than the first interferometer.

Examples are described herein using interferometric detectors. However, interferometric detectors are not the only type of detectors that can achieve a desired effect of determining the pupil that corresponds to the eye location. Interferometric detectors use coherence-gating to determine the proper pupil to use. Other example implementations may utilize time-of-flight detectors with temporal-gated detection to achieve the same effect. Alternatively, direct-detection detectors with confocal or comparable spatial-gating may be used to remove out-of-focus light from the replicated pupils that do not correspond to the eye's actual location. It will be appreciated that, while some examples are disclosed as being implemented using fibers or optical fibers, such examples may be implemented using any combination of bulk optics, fiber optics, and/or integrated-photonic components.

Figure 8:
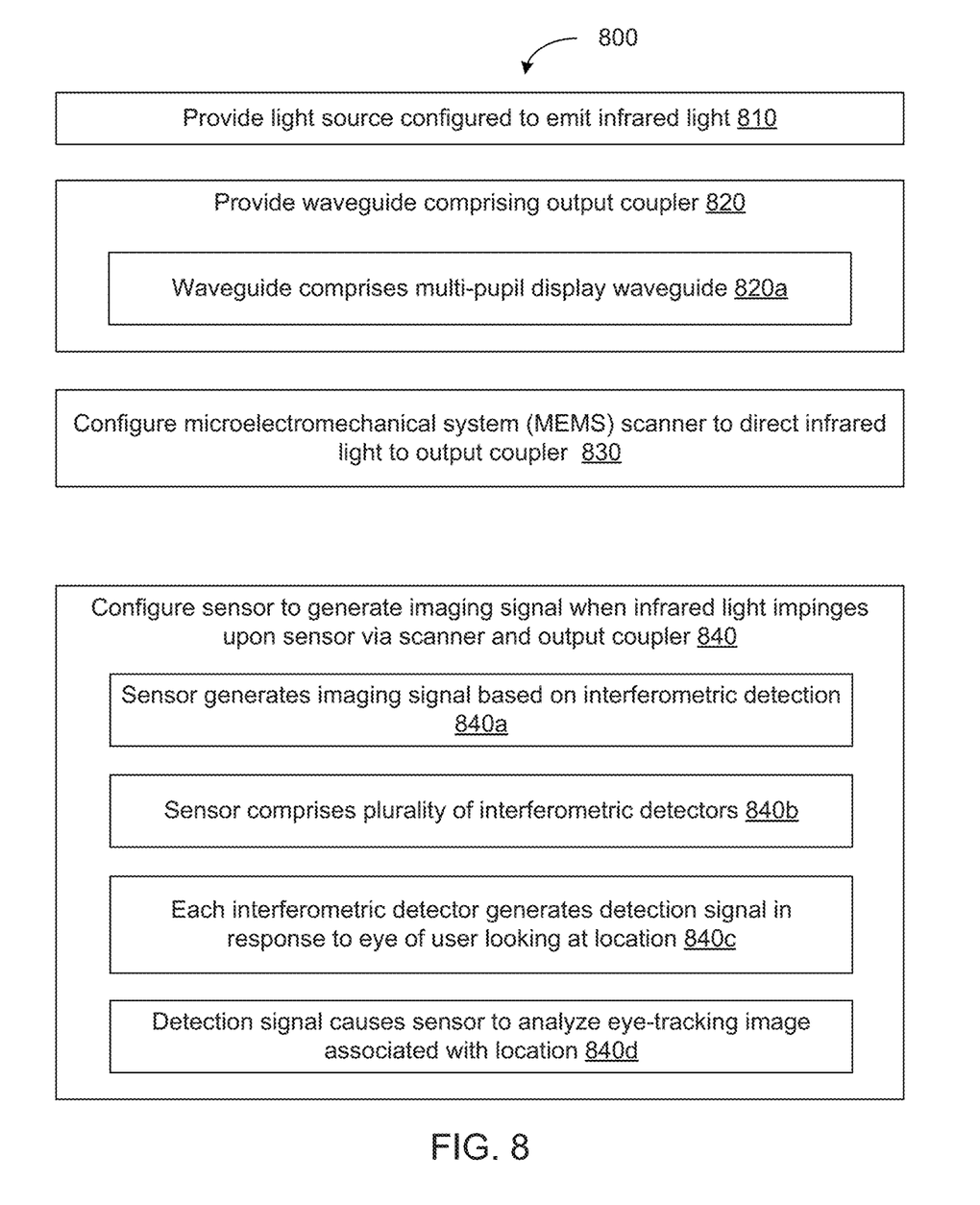
FIG. 8 illustrates a flow diagram of a method for creating an eye-tracking system for a head-mounted display (HMD) device, according to various examples.

FIG. 8 is a flow diagram illustrating a method 800 for creating an eye-tracking system for a head-mounted display (HMD) device, according to various examples. In various examples, the method 800 may be performed by a device (e.g., a fabrication system). In some examples, the method 800 is performed by processing logic, including hardware, firmware, software, or a combination thereof. The method 800 may be performed by a processor executing code stored in a non-transitory computer-readable medium (e.g., a memory). Briefly, in various examples, the method 800 may include providing a light source that is configured to emit infrared (IR) light and a waveguide comprising an input coupler. A scanner may be provided to direct the infrared (IR) light to the input coupler. The input coupler may be configured to direct the infrared (IR) light to exit the waveguide toward an eyebox region for eye-tracking. The scanner may also be configured to direct visible light to the input coupler. The input coupler may be configured to direct the visible light to the eyebox region for display as a virtual image. A sensor may be provided to generate an imaging signal when infrared (IR) light impinges upon the sensor via the scanner and the input coupler.

As represented by block 810, in various examples, the method 800 may include providing a light source that is configured to emit infrared (IR) light. The light source may include one or more light emitting diodes (LEDs), one or more vertical-cavity surface emitting lasers (VCSELs), micro light emitting diodes (micro-LEDs), edge emitting light emitting diodes (LEDs), one or more superluminescent diodes (SLEDs), or another type of light source. The light source may emit near-infrared (NIR) light. In some examples, a lens may be used to control the shape of an emitted infrared (IR) light beam. For example, a lens may be designed such that light rays emitted by the light source are collimated or focused.

As represented by block 820, in various examples, the method 800 may include providing a waveguide that includes an input coupler. The input coupler may be implemented as a diffractive optical element that is configured to operate on the specific wavelength or wavelengths of light (e.g., infrared (IR) light) emitted by the light source while passing other wavelengths of light. The input coupler may be implemented as a holographic optical element configured to operate on the specific wavelength or wavelengths of light emitted by the light source. The input coupler may be reflective or refractive. The input coupler may be configured to diffract infrared (IR) or near-infrared (NIR) light to exit the waveguide toward the eyebox region for eye-tracking. The input coupler may be configured to direct (e.g., pass) visible light toward the eyebox region for display as a virtual image, e.g., without diffraction. Passing visible light may allow for display light (if any) or scene light from an external environment of a head mounted display (HMD) device to propagate through the input coupler to be viewed by a user of the head mounted display (HMD) device.

As represented by block 820a, the waveguide may be implemented as a multi-pupil display waveguide that includes a plurality of pupils. Each pupil may correspond to a portion of the eyebox region. Each pupil may be associated with a detector that generates a detection signal when the user's eye looks at a location associated with the pupil. The detection signal may indicate that the user's gaze is directed to a location within the portion of the eyebox region that corresponds to the pupil.

As represented by block 830, in various examples, the method 800 may include providing a scanner configured to direct the infrared (IR) light to the input coupler. The input coupler may be configured to direct the infrared (IR) light to exit the waveguide toward an eyebox region for eye-tracking. The scanner may be configured to direct visible light to the input coupler. The input coupler may be configured to direct the visible light toward the eyebox region for display as a virtual image.

As represented by block 840, in various examples, the method 800 may include providing a sensor that is configured to generate an imaging signal when infrared (IR) light impinges upon the sensor via the scanner and the input coupler. As represented by block 840*a*, the sensor may generate the imaging signal based on interferometric detection. For example, a sensing path may be provided in which returning light from the eyebox region propagates to a beam splitter in a reverse-optical path as the infrared (IR) light illuminating the eyebox region. The returning light may be the illuminating infrared (IR) light reflecting or scattering from an eye of the user that occupies the eyebox region, for example. Skin, eyelashes, and/or eyebrows may also reflect and/or scatter the illumination light illuminating the eyebox region. However, the reflected light from the retina may efficiently propagate to an input coupler and through one or more other optical components, if present. The returning light may reflect off a scanner and off the beam splitter as returning light to the sensor. A waveguide or optical fiber may be optically coupled to guide the returning light from the beam splitter to the sensor. It will be appreciated that, while some examples are disclosed as being implemented using fibers or optical fibers, such examples may be implemented using any combination of bulk optics, fiber optics, and/or integrated-photonic components.

In some examples, when the returning infrared (IR) light impinges upon the sensor, the sensor may generate an imaging signal, which may be implemented as an analog signal. An analog-to-digital converter (ADC) may convert the analog signal to a digital imaging signal. The analog-to-digital converter (ADC) may provide the digital imaging signal to processing logic that may be configured to generate an eye-tracking image based at least in part on imaging signals. As the scanner scans through and illuminates different imaging points of the eyebox region with infrared (IR) light, an imaging signal may be generated by the sensor for each imaging point and may be stored to a memory. Accordingly, each imaging point within the eyebox region may be associated with a corresponding imaging signal so that imaging signals may be aggregated to assist in generating an eye-tracking image of the eyebox region.

As represented by block 840*b*, the sensor may include a plurality of interferometric detectors. Each interferometric detector may correspond to a respective pupil of the waveguide. In some examples, as represented by block 840*c*, each interferometric detector may generate a detection signal in response to the user looking at a location that is associated with the pupil corresponding to the interferometric detector. For example, referring to FIG. 5, interferometric detector 510-1 may generate detection signal 512-1 when the eye of the user looks at a location that is associated with the pupil 506-1.

In some examples, as represented by block 840*d*, the detection signal may cause the sensor to analyze an eye-tracking image associated with the location. For example, if the user's eye looks at a location associated with the pupil 506-1 of FIG. 5, the detection signal 512-1 may cause the sensor 510 to analyze an eye-tracking image that is associated with the pupil 506-1. Image data corresponding to the pupil may be obtained and analyzed to determine the location at which the user's gaze is directed. For example, the location may be determined based on the position of the user's pupil or pupils and/or any glints, e.g., reflections of light from the user's pupil or pupils.

In some examples, detection signals corresponding to multiple pupils may be used to select which image data to analyze. For example, if the detection signals indicate that the user's eye is looking at the locations associated with two pupils, the image data corresponding to locations associated with those two pupils may be analyzed. The image data that corresponds to locations associated with other pupils may be omitted from analysis.

Figure 9:
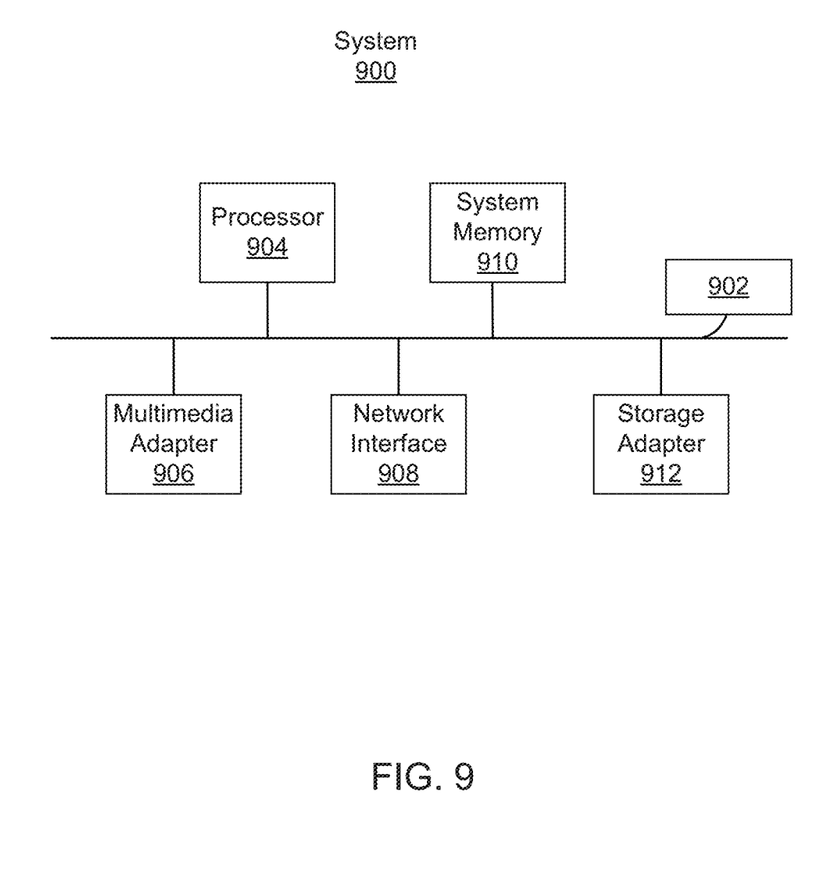
FIG. 9 illustrates a block diagram of a computer system for providing eye-tracking system in a head-mounted display (HMD) device, according to various examples.

FIG. 9 illustrates a block diagram of a computer system for providing eye-tracking system in a head-mounted display (HMD) device, according to various examples. The computer system 900 may include, among other things, an interconnect 902, a processor 904, a multimedia adapter 906, a network interface 908, a system memory 910, and a storage adapter 912.

The interconnect 902 may interconnect various subsystems, elements, and/or components of the computer system 900. As shown, the interconnect 902 may be an abstraction that may represent any one or more separate physical buses, point-to-point connections, or both, connected by appropriate bridges, adapters, or controllers. In some examples, the interconnect 902 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1394 bus, or "firewire," or other similar interconnection element.

In some examples, the interconnect 902 may allow data communication between the processor 904 and system memory 910, which may include read-only memory (ROM) or flash memory (neither shown), and random access memory (RAM) (not shown). It should be appreciated that the RAM may be the main memory into which an operating system and various application programs may be loaded. The ROM or flash memory may include, among other code, the Basic Input-Output system (BIOS) that controls basic hardware operation, such as the interaction with one or more peripheral components.

The processor 904 may be the central processing unit (CPU) of the computing device and may control overall operation of the computing device. In some examples, the processor 904 may accomplish this by executing software or firmware stored in system memory 910 or other data via the storage adapter 912. The processor 904 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 906 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 908 may provide the computing device with an ability to communicate with a variety of remote devices over a network and may include, for example, an Ethernet adapter, a Fibre Channel adapter, and/or another wired- or wireless-enabled adapter. The network interface 908 may provide a direct or indirect connection from one network element to another, and facilitate communication and between various network elements.

The storage adapter 912 may connect to a standard computer-readable medium for storage and/or retrieval of information, such as a fixed disk drive (internal or external).

In the foregoing description, various examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. An eye-tracking system, comprising:
   a light source to emit infrared (IR) light;
   a waveguide comprising an input coupler;
   a scanner to direct the infrared (IR) light from the light source to the input coupler, wherein
      the scanner is to direct visible light to the input coupler, and
      the input coupler is to direct the infrared (IR) light to exit the waveguide toward an eyebox region for eye-tracking and the visible light toward to the eyebox region for display as a virtual image; and
   a sensor to generate an imaging signal when the infrared (IR) light impinges upon the sensor via the scanner and the input coupler.

2. The eye-tracking system of claim 1, wherein the waveguide comprises a is multi-pupil display waveguide comprising a plurality of pupils.

3. The eye-tracking system of claim 2, wherein the sensor comprises a plurality of interferometric detectors, time-of-flight detectors, or spatially-gated detectors, and
   each detector corresponds to a respective pupil.

4. The eye-tracking system of claim 3, wherein each detector generates a detection signal in response to an eye of a user looking at a location associated with the pupil corresponding to the detector.

5. The eye-tracking system of claim 4, wherein the detection signal causes the sensor to analyze an eye-tracking image associated with the location.

6. The eye-tracking system of claim 1, wherein the sensor generates the imaging signal based on interferometric, time-of-flight, or spatially-gated to detection.

7. The eye-tracking system of claim 1, wherein the scanner comprises a microelectromechanical system (MEMS) scanner.

8. A head-mounted display (HMD) device, comprising:
   a light source to emit infrared (IR) light;
   a waveguide comprising an input coupler;
   a scanner to direct the infrared (IR) light from the light source to the input coupler, wherein
      the scanner is to direct visible light to the input coupler, and
      the input coupler is to direct the infrared (IR) light to exit the waveguide toward an eyebox region for eye-tracking and the visible light toward the eyebox region for display as a virtual image; and
   a sensor to generate an imaging signal when infrared (IR) light impinges upon the sensor via the scanner and the input coupler.

9. The head-mounted display (HMD) device of claim 8, wherein the waveguide comprises a multi-pupil display waveguide comprising a plurality of pupils.

10. The head-mounted display (HMD) device of claim 9, wherein
    the sensor comprises a plurality of interferometric detectors, time-of-flight detectors, or spatially-gated detectors, and
    each detector corresponds to a respective pupil.

11. The head-mounted display (HMD) device of claim 10, wherein each detector generates a detection signal in response to an eye of a user looking at a location associated with the pupil corresponding to the detector.

12. The head-mounted display (HMD) device of claim 11, wherein the detection signal causes the sensor to analyze an eye-tracking image associated with the location.

13. The head-mounted display (HMD) device of claim 8, wherein the sensor generates the imaging signal based on interferometric, time-of-flight, or spatially-gated detection.

14. The head-mounted display (HMD) device of claim 8, wherein the scanner comprises a microelectromechanical system (MEMS) scanner.

15. A method comprising:
    providing a light source configured to emit infrared (IR) light;
    to providing a waveguide comprising an input coupler;
    configuring a microelectromechanical system (MEMS) scanner to direct the infrared (IR) light from the light source to the input coupler, wherein
       the microelectromechanical system (MEMS) scanner is to direct visible light to the input coupler, and
       the input coupler is to direct the infrared (IR) light to exit the waveguide toward an eyebox region for eye-tracking and the visible light toward the eyebox region for display as a virtual image; and
    configuring a sensor to generate an imaging signal when infrared (IR) light impinges upon the sensor via the scanner and the input coupler.

16. The method of claim 15, wherein the waveguide comprises a multi-pupil display waveguide comprising a plurality of pupils.

17. The method of claim 16, wherein the sensor comprises a plurality of interferometric detectors, time-of-flight detectors, or spatially-gated detectors, and each detector corresponds to a respective pupil.

18. The method of claim 17, wherein each detector generates a detection signal in response to an eye of a user looking at a location associated with the pupil corresponding to the detector.

19. The method of claim 18, wherein the detection signal causes the sensor to analyze an eye-tracking image associated with the location.

20. The method of claim 15, wherein the sensor generates the imaging signal based on interferometric, time-of-flight, or spatially-gated detection.

* * * * *